United States Patent [19]
Shalit

[11] Patent Number: 5,875,457
[45] Date of Patent: Feb. 23, 1999

[54] FAULT-TOLERANT PRESERVATION OF DATA INTEGRITY DURING DYNAMIC RAID SET EXPANSION

[75] Inventor: Amir Shalit, Fremont, Calif.

[73] Assignee: Mylex Corporation, Fremont, Calif.

[21] Appl. No.: 727,745

[22] Filed: Oct. 8, 1996

[51] Int. Cl.[6] .................................................. G06F 12/02
[52] U.S. Cl. .............................. 711/114; 711/4; 711/165; 711/170; 711/172; 711/111; 395/182.04; 395/182.05
[58] Field of Search ........................ 395/182.04, 182.05; 711/114, 165, 170, 172, 111, 4

[56] References Cited

U.S. PATENT DOCUMENTS

| | | | |
|---|---|---|---|
| 5,537,534 | 7/1996 | Voigt et al. | 395/182.04 |
| 5,542,065 | 7/1996 | Burkes et al. | 711/114 |
| 5,546,558 | 8/1996 | Jacobson et al. | 711/114 |
| 5,551,003 | 8/1996 | Mattson et al. | 711/136 |
| 5,572,661 | 11/1996 | Jacobson | 395/182.05 |
| 5,574,851 | 11/1996 | Rathunde | 395/182.05 |
| 5,615,352 | 3/1997 | Jacobson et al. | 711/114 |
| 5,651,133 | 7/1997 | Burkes et al. | 711/114 |
| 5,657,468 | 8/1997 | Stallmo et al. | 711/114 |
| 5,659,704 | 8/1997 | Burkes et al. | 395/182.04 |
| 5,664,187 | 9/1997 | Burkes et al. | 707/205 |
| 5,666,512 | 9/1997 | Nelson et al. | 711/114 |

*Primary Examiner*—Tod R. Swann
*Assistant Examiner*—J. Peikari
*Attorney, Agent, or Firm*—Fish & Richardson P.C.

[57] ABSTRACT

A method and apparatus for dynamically expanding an N drive RAID set to an M drive RAID set while maintaining data integrity, where the M drive RAID set includes one or more new drives. The method comprises the steps of identifying a destructive zone in the N drive RAID set including destructive zone data. Thereafter the destructive zone data is mirrored in the M drive RAID set by copying it to a free location in the N drive RAID set and to a location in a new drive in the M drive RAID set. Finally, the N drive RAID set is expanded to an M drive RAID set. Data integrity is assured in the N drive RAID set during migration by maintaining mirrored destructive zone data until the expansion step has completed migration of the destructive zone of the N drive RAID set.

22 Claims, 9 Drawing Sheets

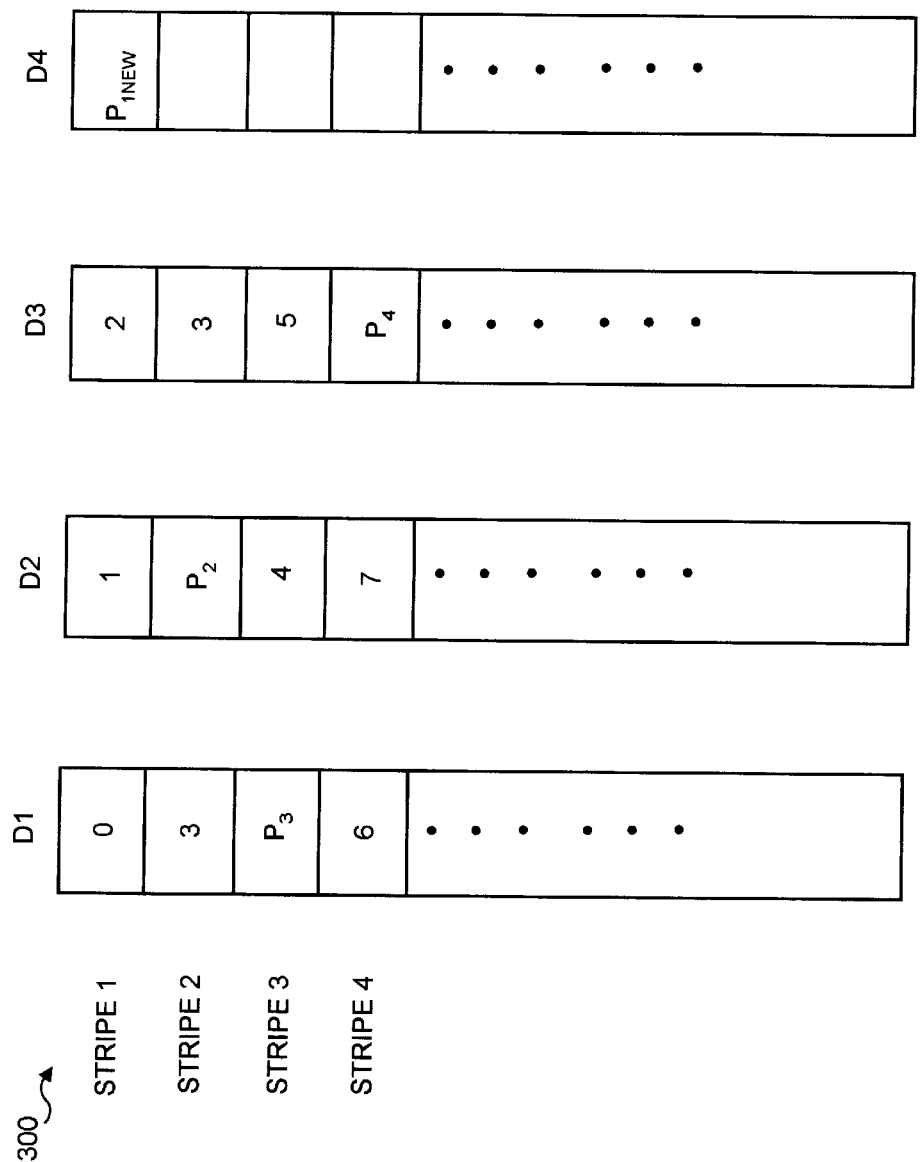

FAULT-TOLERANT PRESERVATION OF DATA INTEGRITY DURING DYNAMIC RAID SET EXPANSION

BACKGROUND

The present invention relates generally to distributed computing systems, and more particularly to a method and apparatus for dynamically expanding a RAID (Redundant Array of Independent Discs) set while assuring data integrity during the expansion process.

In a distributed computing system, a host is connected to a storage (memory) system via a storage controller. The host communicates with the storage controller through an interface, such as a small computer systems interface (SCSI). RAID technology is often employed to provide data redundancy for distributed computing systems. In a RAID architecture system, the host communicates to a RAID storage controller via an interface (SCSI). In turn, the RAID storage controller is connected to one or more storage elements (i.e., the RAID set, which may include hard disc drives, optical discs, or magnetic tape drives) for storing host data. The host writes to or reads from the storage elements through the RAID storage controller. The RAID storage controller writes data to the various storage elements according to the user's selected RAID level providing the user a selectable level of redundancy for host data.

In some systems the number of storage elements for storing the host data is variable. That is, the number of storage elements is dependent on the amount of information required to be stored. Accordingly, for some systems, expansion to add one or more storage elements to the existing RAID set is required as host storage requirements increase.

One problem that has arisen during RAID set expansion is maintaining data integrity for the system in the event of a failure during the expansion process. While ordinarily data integrity is high because of the redundancy built into the RAID architecture system, during the expansion process, singular failures may result in data loss. In order to assure data integrity, some systems disable storage operations during the expansion process, thereby disabled the host from accessing the system storage. While this allows for easier configuration control over the storage system, it results in inefficiencies in the host. What is desired is to provide for dynamic expansion capability while maintaining host data integrity.

SUMMARY OF THE INVENTION

In general, in one aspect, the invention provides a method and apparatus for dynamically expanding an N drive RAID set to an M drive RAID set while maintaining data integrity, where the M drive RAID set includes one or more new drives. In one aspect of the invention, the method comprises the steps of identifying a destructive zone in the N drive RAID set, including destructive zone data. Thereafter, the destructive zone data is mirrored in the M drive RAID set by copying it to a free location in the N drive RAID set and to a location in a new drive in the M drive RAID set. Finally, the N drive RAID set is expanded to an M drive RAID set. Data integrity is assured in the N drive RAID set during migration by maintaining mirrored destructive zone data until the expansion step has completed migration of the destructive zone of the N drive RAID set.

One advantage of the invention is that data integrity is maintained during a dynamic expansion process thereby allowing for increased host efficiency.

Other advantages and features will be apparent from the following description and claims.

BRIEF DESCRIPTION OF THE DRAWINGS

FIG. 3b is a schematic block diagram of the RAID set of FIG. 3a after expansion of the first and second data stripes.

DETAILED DESCRIPTION

Figure 1:
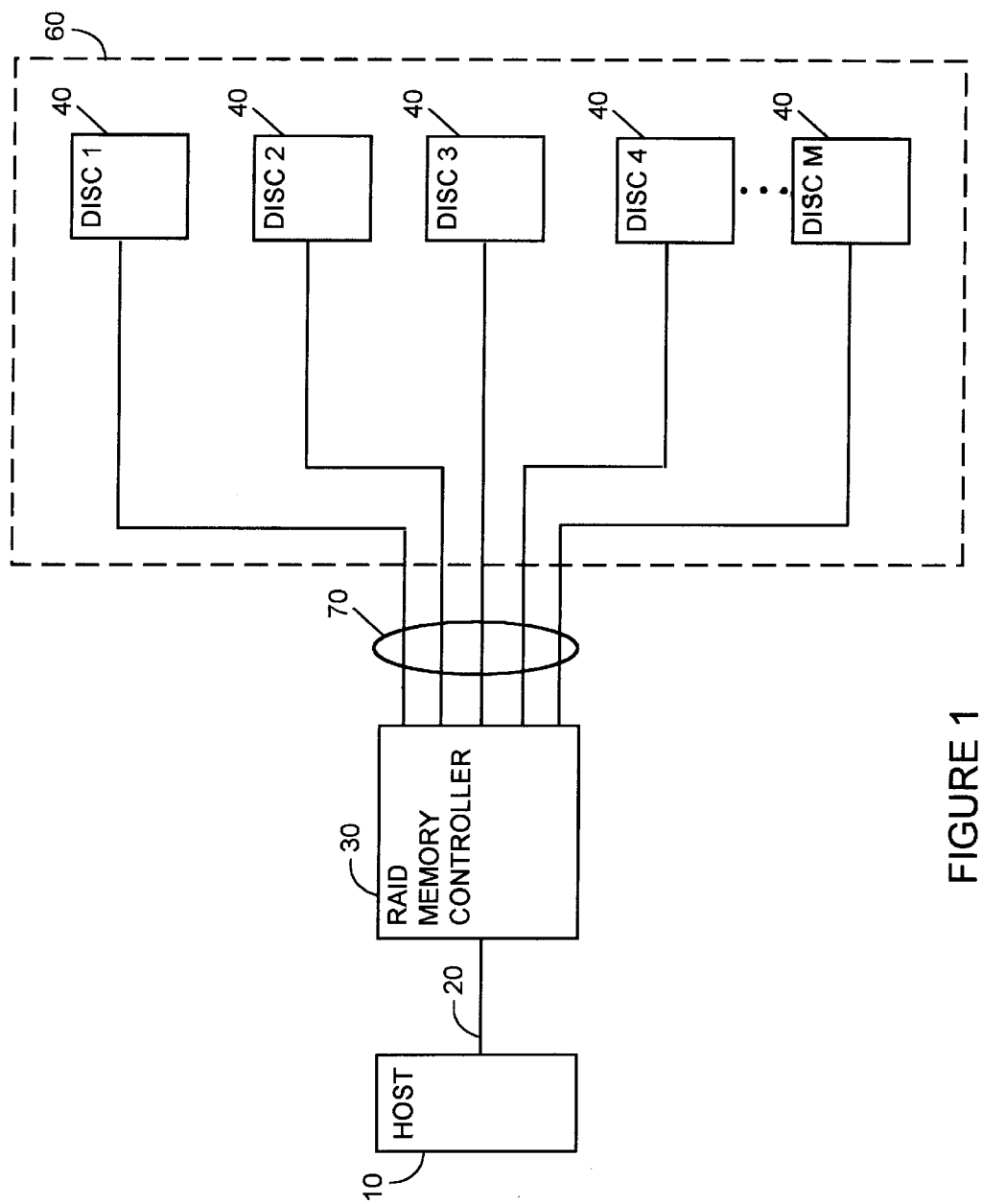
FIG. 1 is a schematic block diagram of a RAID architecture distributed computing system according to one embodiment of the present invention.

Referring to FIG. 1, in a RAID architecture system, a host 10 is connected via a bus 20 to a RAID storage controller 30. Attached to the RAID storage controller 30 are one or more storage elements 40, the sum of which comprise array 60 (the RAID set). Each storage element 40 in array 60 is connected to the RAID storage controller 30 via a back plane bus system 70. In one embodiment of the invention, the back plane bus system 70 connects SCSI ports on the RAID storage controller 30 to SCSI ports on each storage element 40 in array 60. Accordingly, information may be written to or from the controller through the back plane bus system 70 to or from any of the storage elements 40 in array 60.

In one embodiment each RAID storage controller includes four SCSI ports with each port able to support connections to up to seven devices. Each port in the RAID storage controller 30 is coupled to one or more storage elements 40 in array 60. The RAID storage controller 30 is configurable to provide user selectable redundancy for host data. Host data may be maintained in any of a number of RAID architecture levels including RAID 0, RAID 1, RAID 3, RAID 5, and RAID 6 architectures. For the purposes of these discussions, a RAID level 5 architecture will be described.

Figure 2:
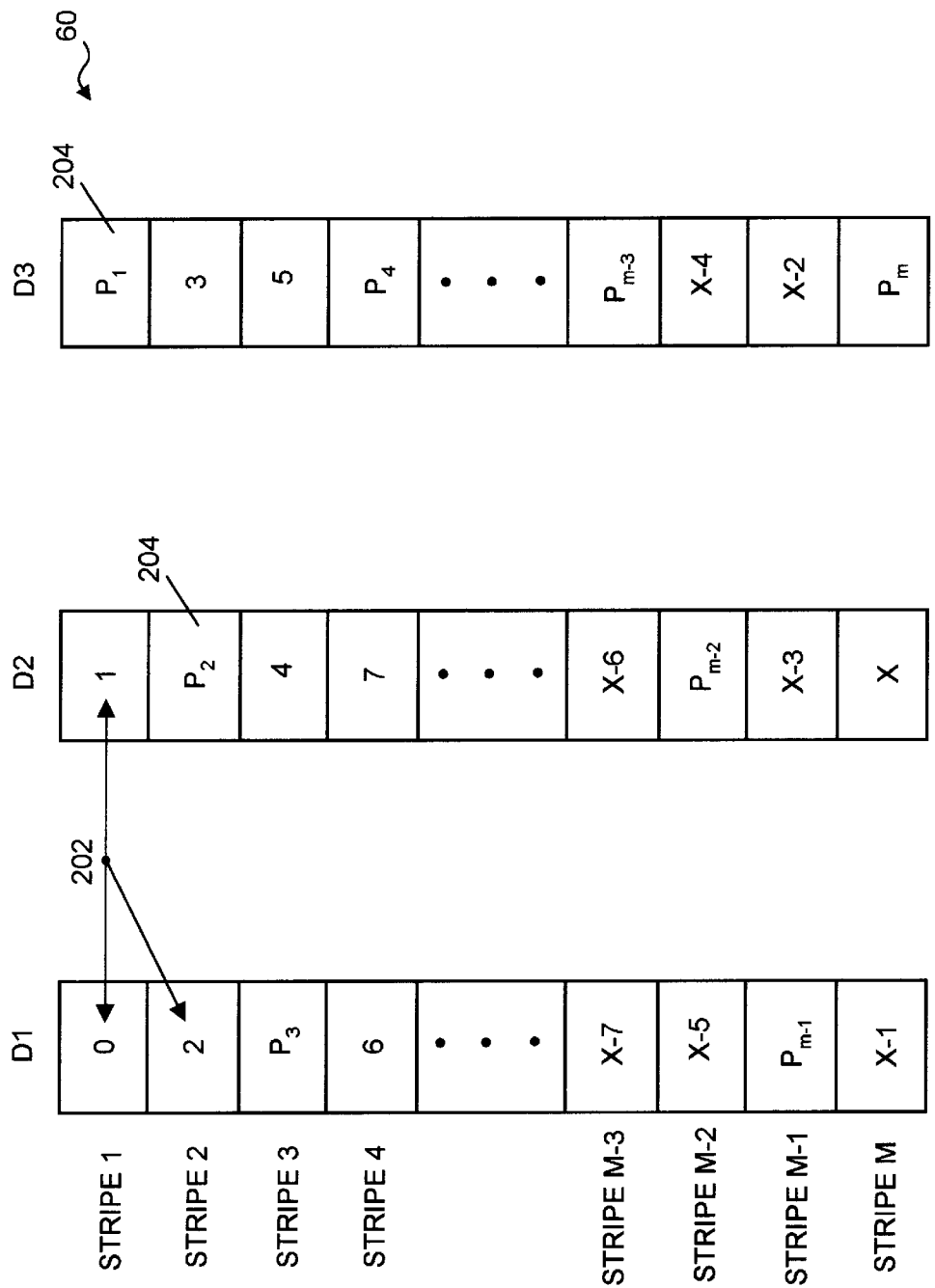
FIG. 2 is schematic block diagram of a RAID set.

RAID set (array 60) includes one or more storage elements. For example, a RAID set may include three storage elements (discs D1, D2 and D3) as is shown in FIG. 2. Data is stored in the RAID set (array 60) in stripes. A stripe of data consists of data blocks 202 which are written across the RAID set and parity information 204. Data maybe striped across the discs such that the parity data may be written to a single disc (RAID level 3), or to any of the discs in the array 60 (RAID level 5).

In order to expand the number of discs in the array 60 to add one or more new storage elements into the array (for example, a fourth disc D4), the data associated with the data stripes must be rewritten. Specifically, data must be rewritten to the larger stripe size (in this example 4 discs). In the prior art, this required the reading of individual stripes of data and rewriting them into the larger stripe configuration.

However, in the event that a failure occurred during the expansion process, data integrity could be compromised.

Figure 3A:
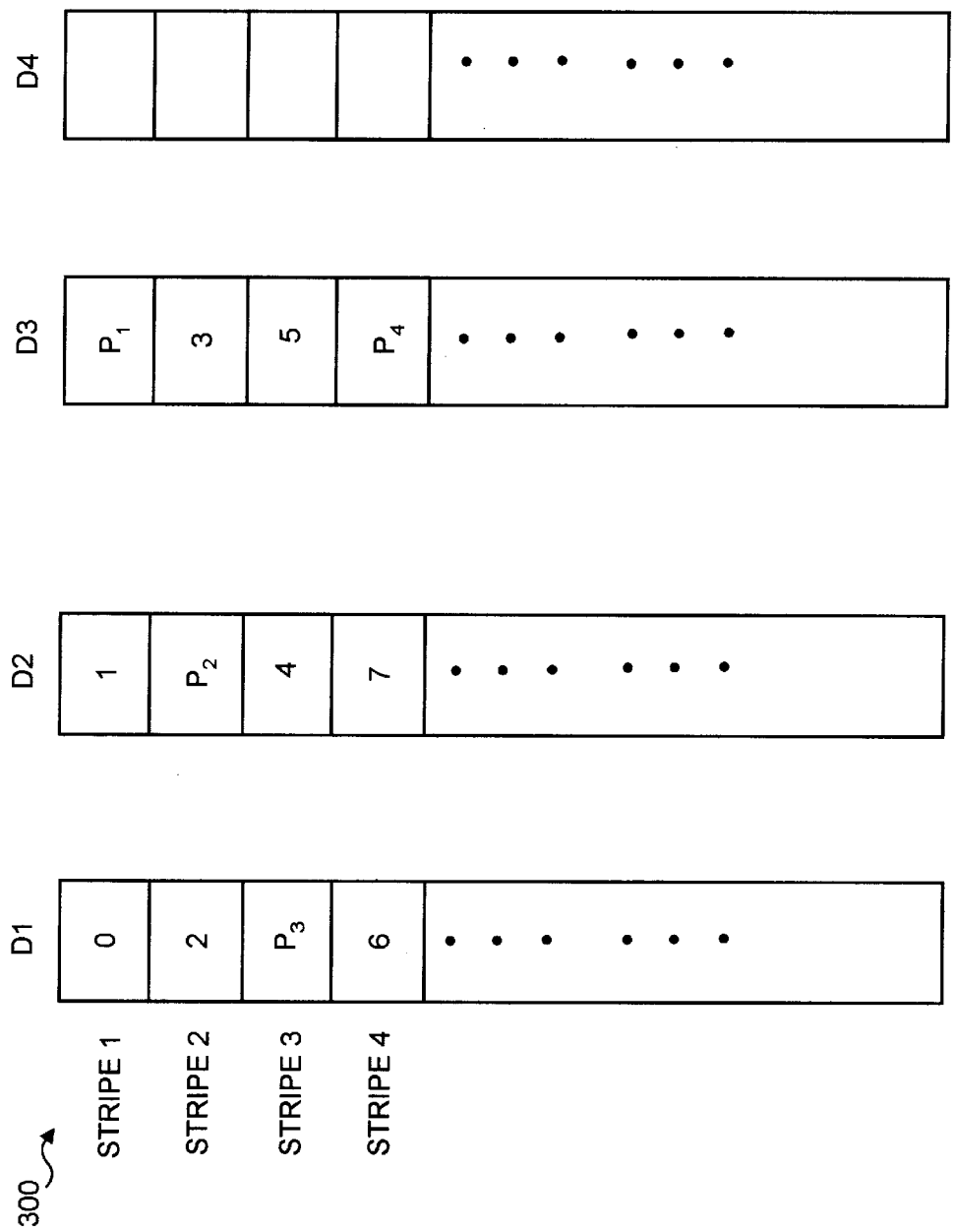
FIG. 3a is a schematic block diagram of a RAID set before expansion.

Referring to FIG. 3a, a RAID set 300 including three discs D1, D2, and D3 is to be expanded by adding in a new disc D4. In the original RAID set, data blocks are distributed across the disc array in stripes which include two blocks of data and a single block of parity information in each stripe. In the new expanded RAID set, each stripe will include three blocks of data spread across three of the discs in the array and a block of parity information on a fourth disc.

Typically, in the prior art during the expansion process, a stripe of data is read at a time. For example, the first stripe of data to be relocated is read (stripe 2) that includes data blocks 2 and 3 and parity information associated therewith $P_2$. After the read, data blocks 2 and 3 are written to their respective new locations in the expanded RAID set at disc D3 and disc D1 to conform to the expanded stripe size which includes disc D4 as is shown in FIG. 3b. Thereafter, parity information $P_{1new}$ is calculated for the new first stripe and subsequently written to disc D4. Accordingly, the first stripe of the RAID set now includes data block 0 on disc D1, data block 1 on disc D2, data block 2 on disc D3 (which has been written over the parity information $P_1$ which originally existed on disc D3), and parity information $P_{1new}$ on disc D4. Stripe 2 contains data block 3 which has been overwritten over the old data block 2 information on disc D1, old parity information $P_2$ on disc D2, and data block 3 at its original location on disc D3.

In the event that a disc failure occurs in the middle of this read and write process, there is a possibility that data may be lost. For example, during the time the original parity information $P_1$ is being over written and prior to the time when the new parity information $P_{1new}$ is generated, a failure in disc D1 or disc D2 would result in lost data. This is because in the prior art systems, the data that is overwritten is resident in a singular location in the RAID set. Accordingly, while the RAID set ordinarily can recover data in the event of a singular disc failure, during the expansion process, the failure would be catastrophic.

Figure 4:
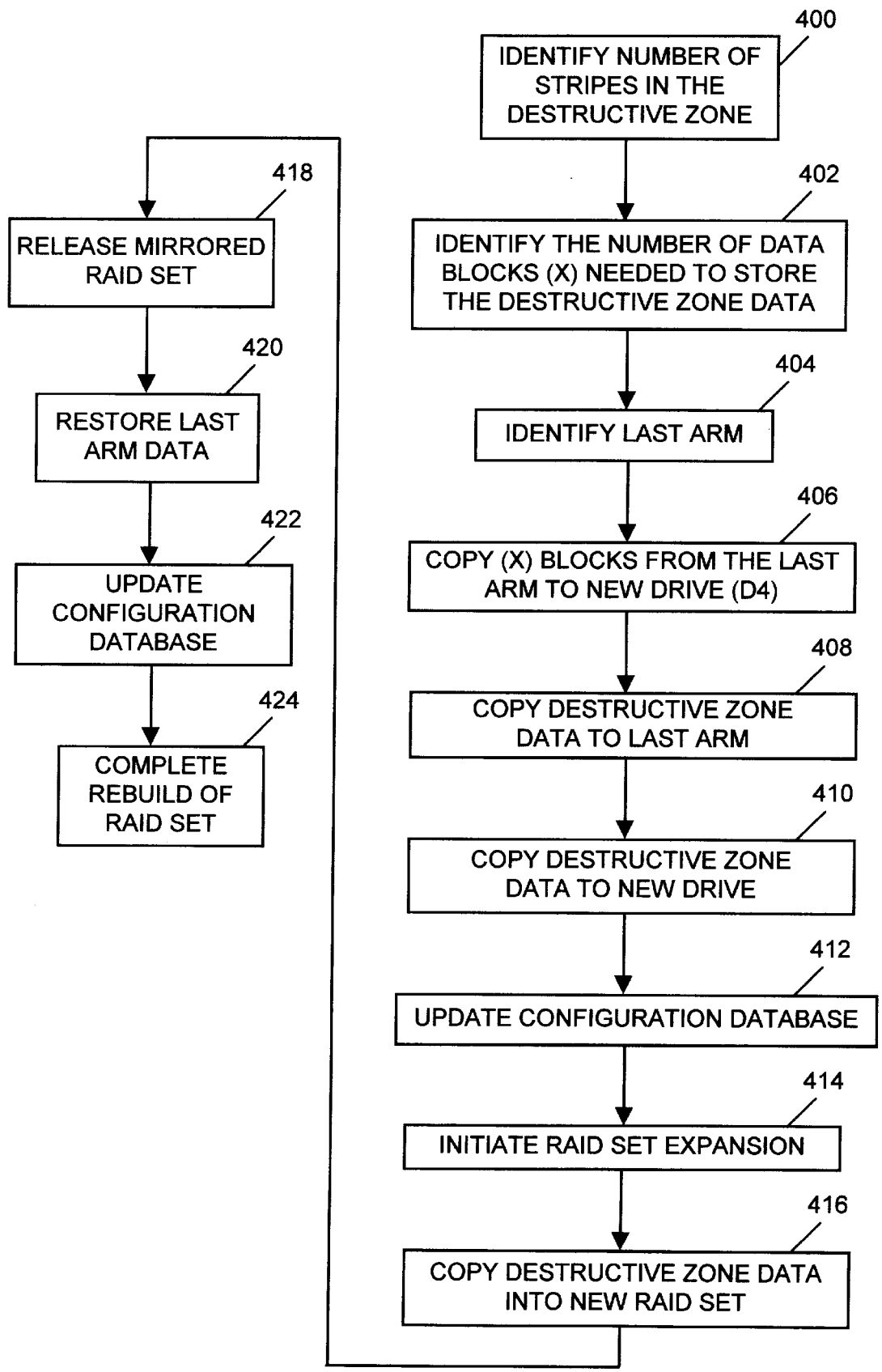
FIG. 4 is a flow diagram of a method of dynamically expanding a RAID set according to one embodiment of the present invention.

Referring now to FIG. 4, a method for assuring data integrity during a dynamic RAID set migration (expansion) process includes identifying a number of stripes in a destructive zone in the original RAID set prior to expansion (400). The destructive zone is defined as a number of stripes in the original disc array (RAID set) which are required to be stored during the expansion process. In one embodiment of the invention, the number of stripes in the destructive zone is calculated based on the number of discs in the original RAID set and the number of discs in the expanded RAID set according to the formulas:

Stripes in Destructive Zone=(N−1)*(M−1),
if the RAID set is a redundant configuration (contains parity or reconstruction data, e.g., RAID 3, RAID 5), or;

Stripes in Destructive Zone=N*M,
if the RAID set is a non-redundant configuration (contains no parity or reconstruction data, e.g., RAID 0), or;

Stripes in Destructive Zone=(N/2)*(M/2),
if the RAID set is a mirrored RAID set (e.g., RAID 1, RAID 6);

where N=number of discs in the original RAID set,
where M=number of discs in the expanded RAID set.

Conceptually, the destructive zone is equal to the number of stripes in the RAID set which are required to be processed during the expansion until at least one or more stripes have been freed completely for use. By freed, we mean that the stripe in the new RAID set being currently written to has had all of its data (from the original RAID set) already written into a new RAID set stripe. Accordingly, any failure in the expansion process as this state is recoverable. After all of the stripes in the destructive zone have been processed, a free stripe (one that has had all of its data already written to a stripe above) is guaranteed to be available for writing data from a next stripe in the expansion of the RAID set.

The controller next will determine the number of data blocks needed to store the destructive zone data identified in step 400 (402). Thereafter, the controller will locate free space on one disc in the N drive RAID set or conversely free up space on one disc. In one embodiment, space is freed at the bottom of one of the discs in the RAID set by copying the data contained therein to the new disc array. First, the controller selects a disc in the original RAID set (hereinafter the "last arm") (404). Thereafter, the controller copies the number of blocks identified from step 402 from the bottom of the disc selected in step 404 (the last arm) to a new disc (D4 in our example) (406). In one embodiment of the invention, the last arm is the last disc in the original disc array. Alternatively, any disc in the array may be used. In one embodiment of the invention, the data from the last arm is copied to the same relative storage location in the new disc (D4).

During the copy of the data from the last arm (the "last arm data") to the new disc (D4), any read or write from the host will access the original RAID set. In the event that a write takes place, then the copy step (406) must be restarted so that the new data for this zone can be copied across to the new disc. At the end of copy step (406), the database for the storage controller is updated to reflect that the last arm data is resident on the new disc D4. Accordingly, subsequent reads and writes to the last arm data will be made to the new disc D4 location.

After the copying of the last arm data is complete, the controller will copy the data from the destructive zone to the last arm (408). During the copy of the data from the destructive zone to the last arm (D3), any read or write from the host will access the original RAID set. In the event that a write takes place to the destructive zone, then the copy step (408) must be restarted such that the new data in this zone may be copied to the last arm location.

Simultaneously, the controller will copy the destructive zone data to a new drive (D4 in our example) creating a mirrored write set associated with the destructive zone data (410). In one embodiment, the destructive zone data is copied to the "middle" of the new drive D4. By "middle", we refer to a location in the new disc above the last arm data, but not in a location which would be overwritten in the expansion of the destructive zone. Accordingly, the exact position is not important, rather, any location in the new disc D4 that satisfies the aforementioned constraints is suitable. During the copy process, reads and writes to the destructive zone will access the original RAID set. Again, in the event a write takes place, the copy process for the destructive zone data is restarted at step 406 to assure data integrity. The configuration database is updated after the copy is complete (412). In one embodiment, the database is updated to reflect that the destructive zone data is located in the new disc D4.

RAID set expansion may now be initiated (414). The process begins by copying a stripe at a time the data blocks in the destructive zone from the original RAID set over to the expanded RAID set (416). During the copy, read and write operations to the destructive zone will access the data at the mirrored RAID location in either the last arm location or in the new drive location. If any write operations to the destructive zone occur during the expansion process (step 414), the destructive zone data in both the new disc D4 location and the last arm location is updated. Thereafter, the migration is restarted at step 416.

After the entire destructive zone from the mirrored RAID set has been copied over into the expanded RAID set, the mirrored RAID set (the last arm in original disc array and the mirrored data located on the new disc array) is no longer required and, accordingly, may be released (418). The controller thereafter restores the last arm data from the new drive back to the original location on the last arm (420). During this copy, read and write operations to the last arm data will access the new disc location. If a write operation takes place, then a restart of the copy is performed. The configuration database is updated after the copy is complete (422).

In one embodiment, the last arm data is not copied back to the original location, and all reads and writes to the last arm data continue to the new disc locations. The restoring of data to the last arm location in the original RAID set is only required if a failure of the new disc occurs. In the event of a failure in the new disc, the last arm data my be reconstructed and written back to the last arm location in the original RAID set.

After the copy back of the data to the last arm, the data locations in the new drive D4 associated with the last arm data are no longer required and can be released.

The remaining stripes of the original RAID set may be recast into the new RAID set by reading the elements of a next stripe group, calculating new parity and executing a write to the new RAID set without the possibility of any data corruption (424).

During the migration of the remainder of the RAID set (the non-destructive zone), any transfers (writes) to the current line of the RAID set being processed (being read from in the old RAID set), will necessitate the restarting of the migration for that particular line. Transfers to lines already processed will be written to the new RAID set. Transfers below the current line being processed will be written to the old RAID set (assuming the last arm data has been copied back to the last arm location).

In one embodiment of the invention, transfers to the old RAID set are blocked during the processing of the destructive zone data (migration of the destructive zone data). Thereafter, only transfers to the current line being processed in the old RAID set are blocked.

In one embodiment, any drive failure during the migration process will halt the migration and will result with a drive failure status report back to the controller. A users can thereafter start a rebuild.

Figure 5A:
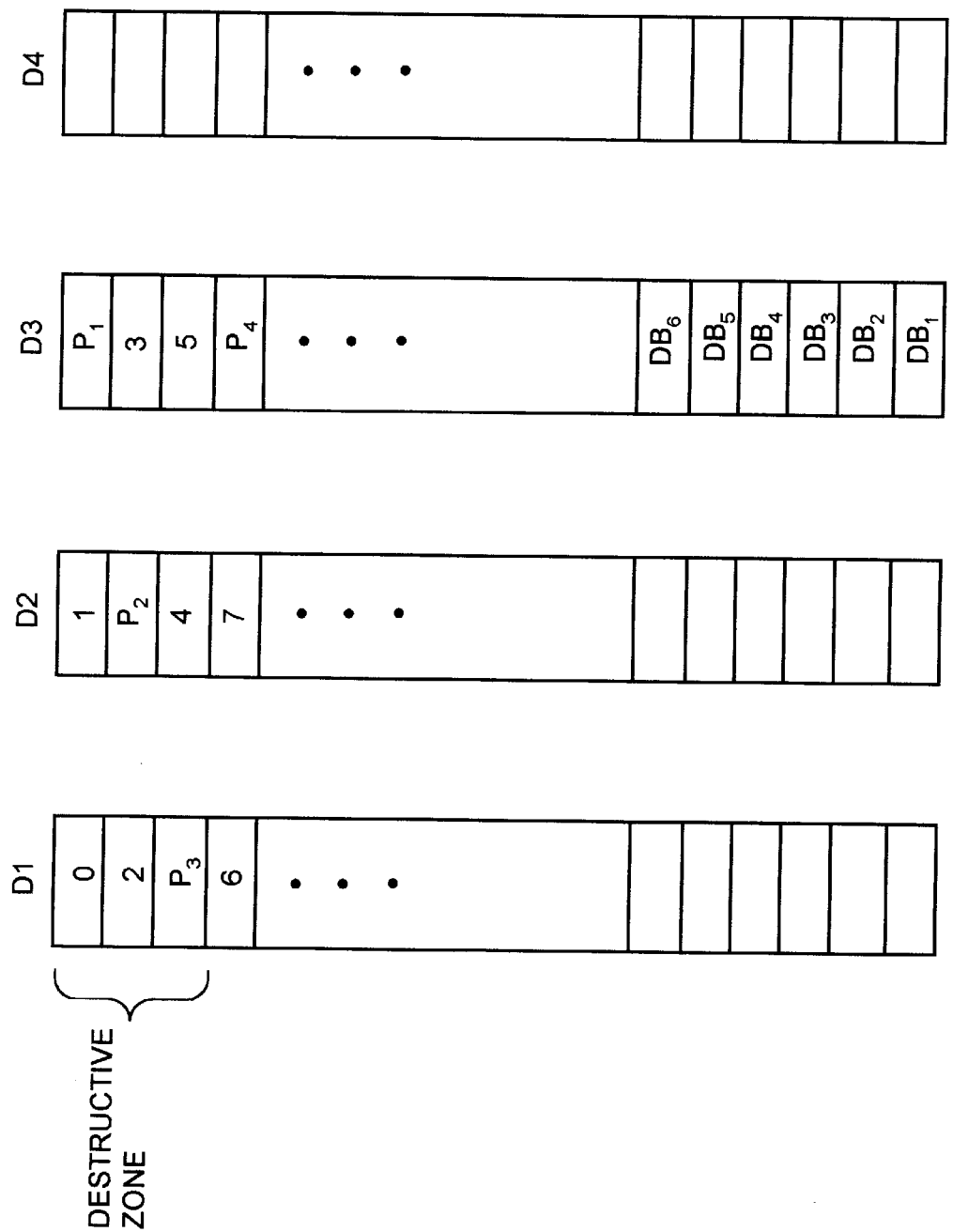
FIG. 5a is a schematic block diagram of a RAID set prior to dynamic expansion according to the present invention.

Referring to FIG. 5a, a three drive RAID set is to be expanded into a four drive RAID set. During the destructive phase, the RAID controller identifies the number of stripes in the first three disc drives (the destructive zone) which must be processed in order to free up one stripe in the new RAID set. Specifically, for the case of a three drive RAID set which includes two data blocks and parity information written across a single stripe, three stripes must be processed in the destructive zone. The three stripes comprise the destructive data ($D_{dest}$) which includes data blocks 0, 1, 2, 3, 4, and 5, respectively, and parity information P1, P2, and P3 for the respective stripes in the original RAID set.

Figure 5B:
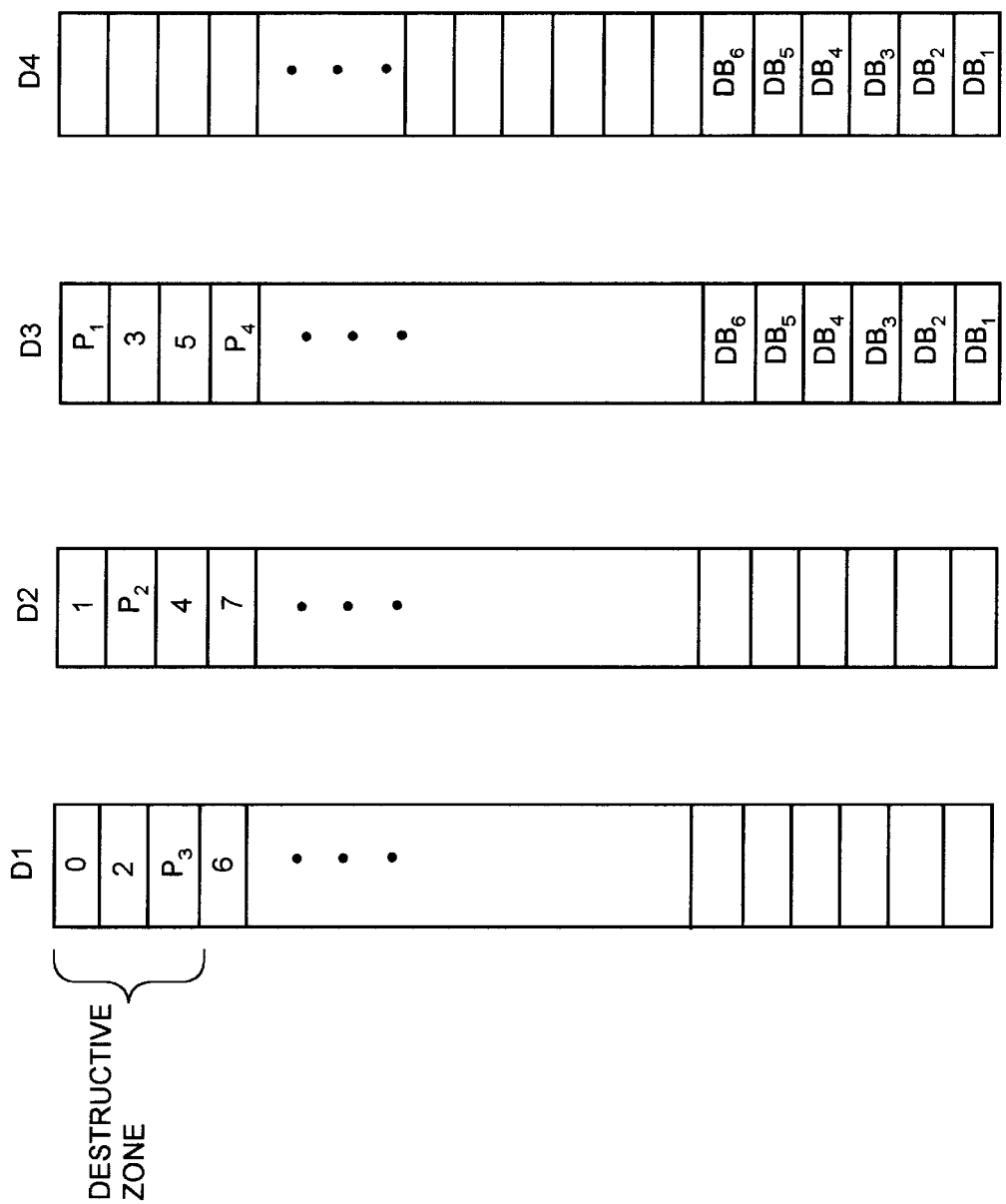
FIG. 5b is a schematic block diagram of the RAID set of FIG. 5a after the last arm data has been copied to a new drive in the expanded RAID set.

Upon identification of the stripes in the destructive zone, the controller identifies the number of data blocks that are required to be transferred across to the new disc drive from the last arm in the disc array. For the purposes of this example, six data blocks are identified (data blocks $DB_1$–$DB_6$). The RAID controller transfers these six data blocks ($DB_1$–$DB_6$), copying them to the new disc at the same relative locations in the new disc D4 as is shown in FIG. 5b.

Figure 5C:
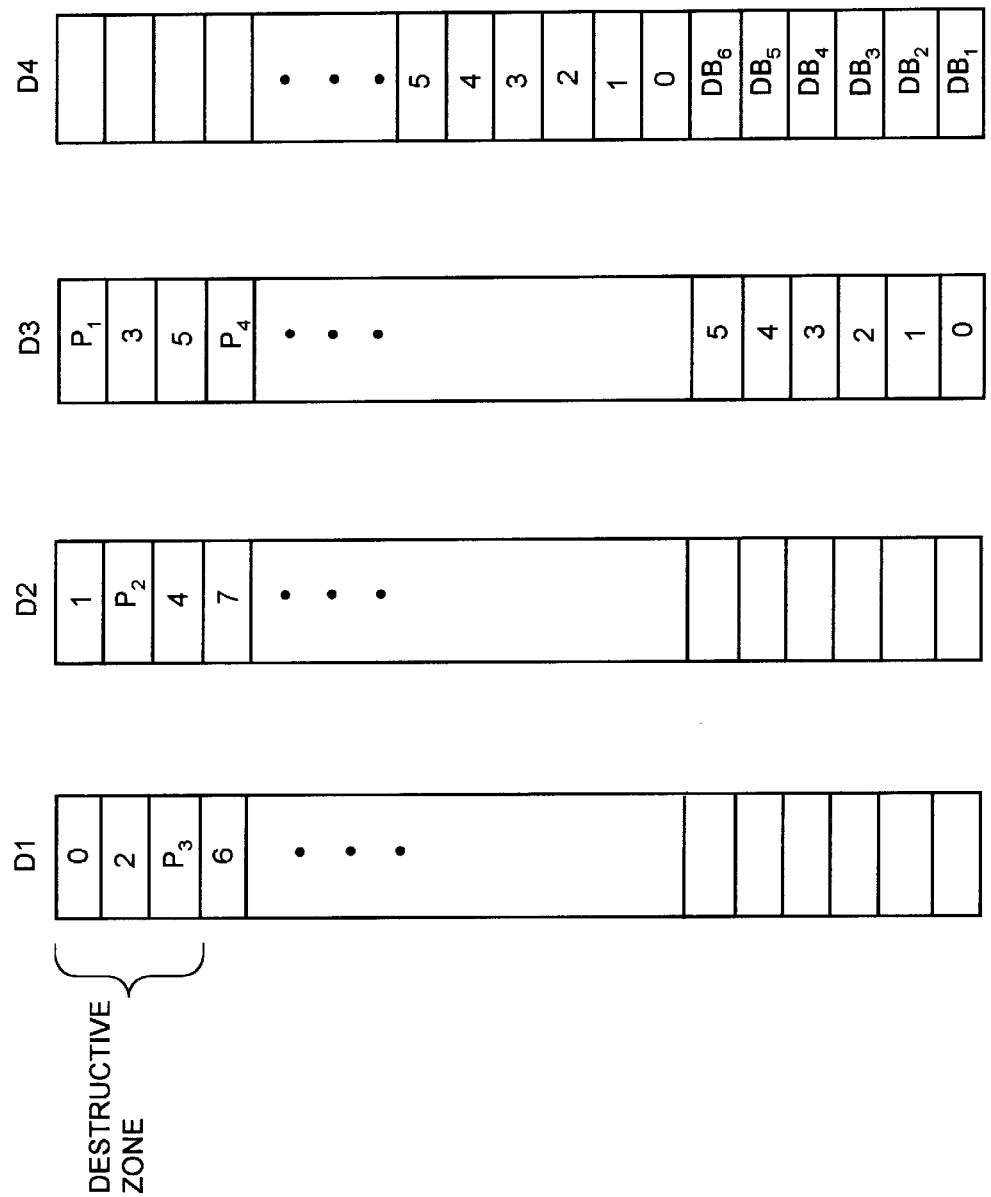
FIG. 5c is a schematic block diagram of the RAID set of FIG. 5b after the destructive zone data has been mirrored to both the last arm and to the new drive.

After the copying of the data from the last arm in the original RAID set to the new disc drive D4, then the data associated with the destructive zone ($D_{dest}$, data blocks 0–5) is written to the last arm location in disc D3. In one embodiment of the invention, the parity data may also be written as part of the destructive zone data. While not directly required for a data rebuild in the event of a failure, the parity information may be helpful in some circumstances to speed the recovery process. Simultaneously, the destructive zone data ($D_{dest}$) is written also to the new disc drive D4 at a location just above the location of the original last arm data. The destructive zone data ($D_{dest}$) is now resident in three locations in the RAID set: in the first three stripes of the RAID set in disc D1, disc D2, disc D3, respectively; in the last arm (disc D3), and finally in the new disc drive D4 just above the original last arm data ($D_1$) as is shown in FIG. 5c.

Figure 5D:
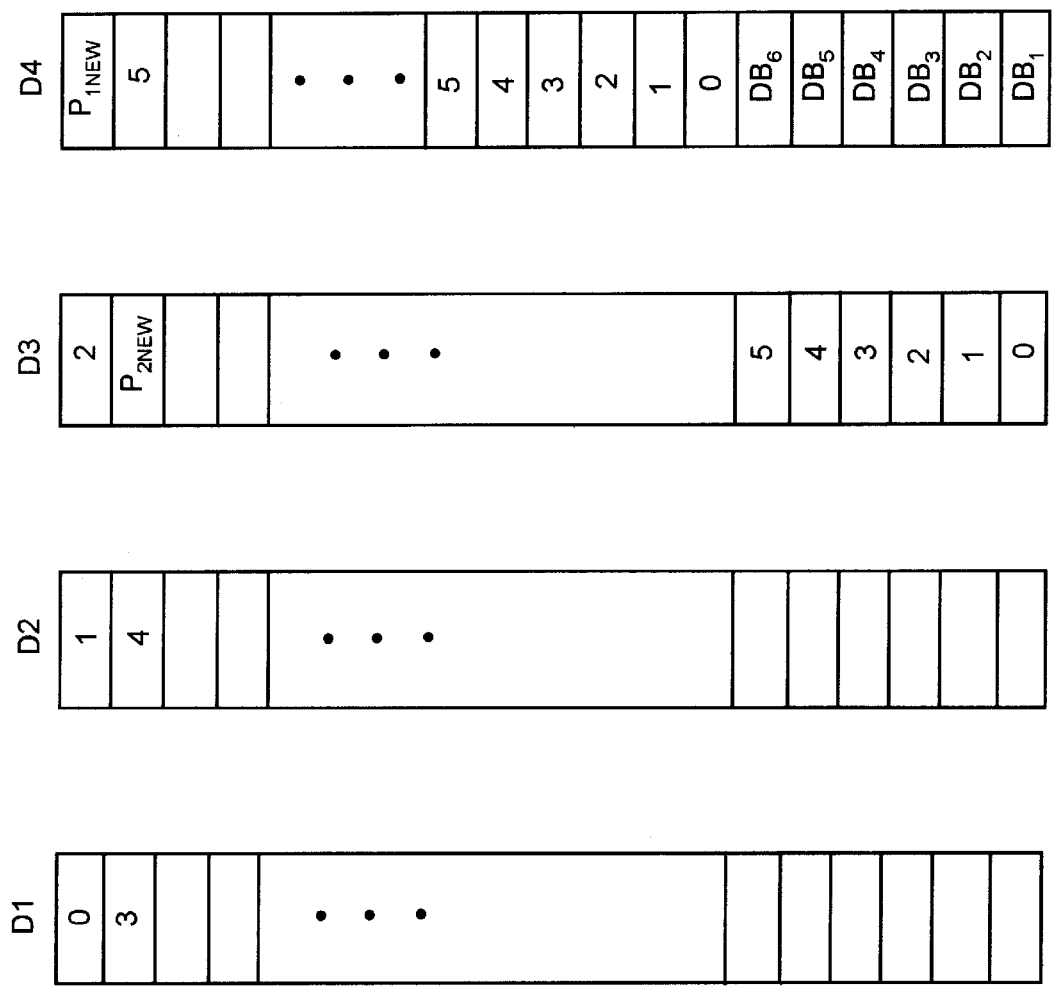
FIG. 5d is schematic block diagram of the RAID set of FIG. 5c after dynamic expansion of the destructive zone of the original RAID set.

The dynamic expansion process may now begin. Specifically, the data stripes associated with the destructive zone(stripes two and three) may be read, new parity information calculated and data and parity information may be written to the new RAID set as is shown in FIG. 5d. The process continues reading stripes from the original RAID set until the last stripe in the original RAID set has been rewritten.

The present invention has been described in terms of specific embodiments, which are illustrative of the invention and not to be construed as limiting.

Other embodiments are within the scope of the following claims.

What is claimed is:

1. A method of dynamically expanding an N drive RAID set to an M drive RAID set while maintaining data integrity, the M drive RAID set including one or more new drives, the method comprising the steps of:

identifying a destructive zone in the N drive RAID set, including destructive zone data wherein the destructive zone includes a plurality of data stripes in the N drive RAID set;

mirroring the destructive zone data by copying it to a free location in the N drive RAID set and to a location in a new drive in the M drive RAID set;

expanding the N drive RAID set to an M drive RAID set including dynamically reorganizing and packing segments within a stripe, whereby data integrity is assured in the N drive RAID set during migration to an M drive RAID set by maintaining mirrored destructive zone data until the expansion step has completed migration of the destructive zone of the N drive RAID set.

2. The method of claim 1 further including the steps of if a free location in the N drive RAID set is not available, identifying a last arm zone of one drive in the N drive RAID set;

copying data from the last arm zone to a new drive in the M drive RAID set;

copying data from the destructive zone to the last arm zone and to a new drive in the M drive RAID set.

3. The method of claim 2 where the data from the last arm zone is copied to a same relative position in the new drive.

4. The method of claim 3 wherein the destructive zone data is copied to a location just above the data from the last arm zone in the new drive.

5. The method of claim 1 wherein the destructive zone is a predetermined number of stripes, and the predetermined number of stripes is calculated according to the formula:

Stripes in Destructive Zone=N*M,
where N=number of drives in the N drive RAID set,
where M=number of drives in the M drive RAID set.

6. The method of claim 5 wherein the number of stripes in the destructive zone is calculated according to the formula:

Stripes in the Destructive Zone=(N−1)*(M−1), if data in the N drive RAID set includes parity data or reconstruction data.

7. The method of claim 5 wherein the number of stripes in the destructive zone is calculated according to the formula:

Stripes in the Destructive Zone=(N/2)*(M/2), if the N drive RAID set is a mirrored RAID set.

8. A method of dynamically expanding an N drive RAID set to an M drive RAID set while maintaining data integrity comprising the steps of:

identifying a destructive zone in the N drive RAID set, the destructive zone having a first size including a plurality of data stripes in the N drive RAID set;

identifying a last arm zone of the first size in one drive in the N drive RAID set, where the last arm zone is not part of the destructive zone;

copying data from the last arm zone to a new drive in the M drive RAID set;

copying data from the destructive zone to the last arm zone and to the new drive in the M drive RAID set;

expanding the N drive RAID set to an M drive RAID set including dynamically reorganizing and packing segments within a stripe, whereby data integrity is maintained in the N drive RAID set during migration to an M drive RAID set by maintaining mirrored destructive zone data located in the last arm zone and the new drive until the expanding step has completed processing of the destructive zone of the N drive RAID set.

9. The method of claim 8 wherein the destructive zone is a predetermined number of stripes, and the predetermined number of stripes is calculated according to the formula:

Stripes in Destructive Zone=N*M,
where N=number of drives in the N drive RAID set,
where M=number of drives in the M drive RAID set.

10. The method of claim 9 wherein the number of stripes in the destructive zone is calculated according to the formula:

Stripes in Destructive Zone=(N−1)*(M−1), if data in the N drive RAID set includes parity data or reconstruction data.

11. The method of claim 9 wherein the number of stripes in the destructive zone is calculated according to the formula:

Stripes in the Destructive Zone=(N/2)*(M/2), if the N drive RAID set is a mirrored RAID set.

12. A method of dynamically expanding an N drive RAID set to an M drive RAID set while maintaining data integrity, the M drive RAID set including one or more new drives, the method comprising the steps of:

identifying a destructive zone in the N drive RAID set including destructive zone data, wherein the destructive zone includes a plurality of data stripes in the N drive RAID set;

mirroring the destructive zone data by copying it to a free location in the N drive RAID set and to a location in a new drive in the M drive RAID set;

dynamically expanding the N drive RAID set to an M drive RAID set including the steps of:

migrating the destructive zone data across the M drive RAID set including dynamically reorganizing and packing segments within a stripe, releasing the destructive zone mirrored data stored in the free location of the N drive RAID set and stored in the new drive upon completion of the destructive zone data migration to the M drive RAID set, and migrating a remainder of the N drive RAID set data across the M drive RAID set, whereby data integrity is maintained in the N drive RAID set during migration to an M drive RAID set by maintaining mirrored destructive zone data until the expanding step has completed processing of the destructive zone of the N drive RAID set.

13. The method of claim 12 wherein the dynamically expanding step further includes the step of blocking read and write operations to the destructive zone during the destructive zone data migration step.

14. The method of claim 12 wherein the migrating the remainder of the N drive RAID set data step includes the steps of:

selecting a current line in the N drive RAID set for processing;

reading the current line; and writing the current line data to the new drive.

15. The method of claim 14 further including the step of blocking write operations to the current line being read.

16. The method of claim 12 further including the steps of:

if a free location in the N drive RAID set is not available, identifying a last arm zone at a bottom of one drive in the N drive RAID set;

copying data from the last arm zone to a new drive in the M drive RAID set;

copying data from the destructive zone to the last arm zone and to a new drive in the M drive RAID set.

17. The method of claim 16 where data from the last arm zone is copied to a same relative position in the new drive.

18. The method of claim 17 wherein the destructive zone data is copied to a location just above data from the last arm zone in the new drive.

19. The method of claim 12 wherein the destructive zone is a predetermined number of stripes, and the predetermined number of stripes is calculated according to the formula:

Stripes in Destructive Zone=N*M,
where N=number of drives in the N drive RAID set,
where M=number of drives in the M drive RAID set.

20. The method of claim 19 wherein the number of stripes in the destructive zone is calculated according to the formula:

Stripes in Destructive Zone=(N−1)*(M−1), if data in the N drive RAID set includes parity data or reconstruction data.

21. The method of claim 19 wherein the number of stripes in the destructive zone is calculated according to the formula:

Stripes in the Destructive Zone=(N/2)*(M/2), if the N drive RAID set is a mirrored RAID set.

22. A RAID storage controller for interfacing between a host and a RAID set comprising:

a controller for transferring data between the host and the RAID set; and a dynamic expansion routine for expanding the data stored in an N drive RAID set into an M drive RAID set, the expansion routine including a destructive zone identifier for identifying a number of data stripes in a destructive zone of the N drive RAID set;

a last arm identifier for identifying a last arm location in one drive of the N drive RAID set sized to hold data from the destructive zone;

a data transport routine for copying data from the last arm location to a new drive in the M drive RAID set, for copying data from the destructive zone to the last arm location and to the new drive in the M drive RAID set; and an expansion routine for expanding data in the N drive RAID set to an M drive RAID set including dynamically reorganizing and packing segments within a stripe, whereby data integrity is maintained during expansion through mirrored destructive zone data at the last arm location and the new drive.

\* \* \* \* \*